United States Patent [19]

Balukin

[11] Patent Number: 4,978,179

[45] Date of Patent: Dec. 18, 1990

[54] BRAKE ASSURANCE CIRCUIT OPERATIVE IN RESPONSE TO A LOW BRAKE PIPE PRESSURE

[75] Inventor: Richard F. Balukin, Pittsburgh, Pa.

[73] Assignee: American Standard Inc., Wilmerding, Pa.

[21] Appl. No.: 355,267

[22] Filed: May 22, 1989

[51] Int. Cl.$^5$ .............................................. B60T 11/34
[52] U.S. Cl. .......................................... 303/33; 303/9; 303/26; 303/39; 303/86
[58] Field of Search .................... 303/9, 28, 29, 30, 42, 303/43, 25, 26, 27, 39, 35, 36, 37, 38, 33, 86

[56] References Cited

U.S. PATENT DOCUMENTS

| | | | |
|---|---|---|---|
| 1,895,473 | 1/1933 | McCune | 303/26 |
| 1,910,543 | 5/1933 | Hewitt | 303/39 |
| 3,781,065 | 12/1973 | Kersting | 303/9 |
| 4,472,001 | 9/1984 | Fannin | 303/9 |

Primary Examiner—Matthew C. Graham
Attorney, Agent, or Firm—G. J. Falce

[57] ABSTRACT

A low brake pipe pressure detecting circuit for a railway train is provided in conjunction with a conventional vent valve device typically associated with the locomotive brake valve device to exhaust the train brake pipe pressure and thereby effect an emergency brake application. Conventional pneumatic pilot valve devices are interconnected with the vent valve device to actuate the vent valve device only for a limited duration following which the pilot valves are automatically reset to effect closure of the vent valve device preparatory to recharging brake pipe pressure to obtain a subsequent brake release.

14 Claims, 2 Drawing Sheets

BRAKE ASSURANCE CIRCUIT OPERATIVE IN RESPONSE TO A LOW BRAKE PIPE PRESSURE

BACKGROUND OF THE INVENTION

The present invention is related to a low brake pipe pressure detecting circuit for assuring that a brake application is initiated on a railway train in the event the train brake pipe pressure drops below a predetermined safe operating value and, more particularly, to a manner of automatically resetting the circuit.

Pilot-operated vent valve devices, such as those employed in the standard 26-B type locomotive brake valve, manufactured by the Westinghouse Air Brake Company, typically employ a poppet-type disc valve carried by a stepped differential piston subject on one side to a pilot pressure that acts over a substantially larger area than the opposing area of the stepped piston subject to brake pipe pressure and main reservoir pressure to normally maintain the valve seated and thereby prevent the brake pipe pressure from being exhausted to atmosphere. When the pilot pressure is exhausted, the force exerted by the brake pipe pressure and main reservoir pressure is effective to unseat the valve, whereby brake pipe pressure is vented to atmosphere and an emergency brake application is obtained in a well-known manner. Various penalty brake arrangements, such as safety or "deadman" control, train control and overspeed control, are predicated on the basis of such a vent valve configuration, whether incorporated in a brake valve device, such as the above-mentioned 26-B type, or a separately contained vent valve device. Actuation of any of the aforementioned systems will invoke a penalty brake application by causing an exhaust of the vent valve pilot pressure to actuate the vent valve device, which in turn exhausts the train brake pipe pressure to produce the desired penalty brake application.

Attempting to employ a vent valve device of the type described to initiate a train brake application whenever an undesirably low brake pipe pressure is detected, however, presents a problem as to how to reset the vent valve device so that brake pipe pressure can be recharged to release the brake application initiated by the low brake pipe pressure detecting circuit.

Such a reset function can be accomplished manually, but would impose another requirement on the operator, in addition to the normal brake valve manipulations he is already required to make.

SUMMARY OF THE INVENTION

It is therefore the object of the present invention to provide a self-resettable, low brake pipe pressure detecting circuit for initiating a brake application through a conventional pilot-type vent valve device any time an undesirably low brake pipe pressure arises.

Briefly, the low brake pipe pressure detecting circuit comprises valve means for connecting a normally charged safety control pipe to a volume reservoir when the train brake pipe pressure is less than a predetermined safe operating level. This creates a momentary drop in the safety control pipe pressure as the air equalizes between the previously charged safety control pipe and the normally vented volume reservoir. A differential piston valve comprising the vent valve device is piloted in response to this drop in safety control pipe pressure to open the vent valve exhaust and accordingly release brake pipe pressure to initiate a brake application in the usual, well-known manner. Following pressure equalization between the safety control pipe and the volume reservoir, safety control pipe pressure will then begin to build up, due to the fact that the safety control pipe is being continuously charged via a control choke, such that the safety control pipe pressure eventually builds to a value sufficient to reset the vent valve differential piston. The volume reservoir can be sized, if so desired, to delay the reset function until the train comes to a halt. With the vent valve reset, the brake pipe exhaust is terminated, so that the brake pipe can be recharged to release the train brakes, as long as other standard type vent valves in the train consist have reset also. When brake pipe pressure is sufficiently charged, the valve means comprising the pressure detecting circuit resets to vent the volume reservoir in readiness for a subsequent cycle of operation.

BRIEF DESCRIPTION OF THE DRAWINGS

The foregoing objective and further advantages of the invention will become apparent from the following explanation of the invention when taken with the accompanying drawings in which.

DESCRIPTION AND OPERATION

Figure 1:
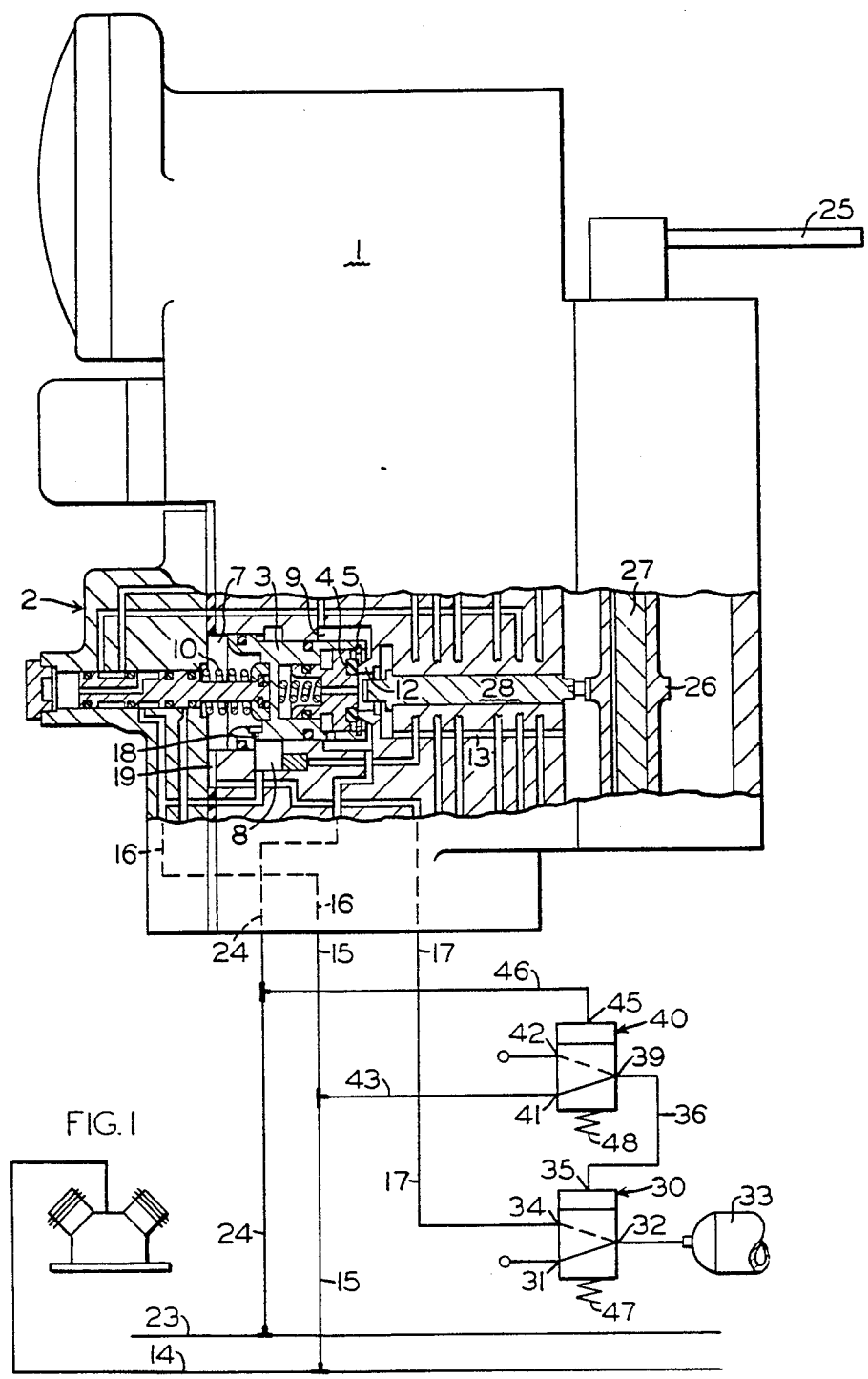
FIG. 1 is a diagrammatic arrangement of one embodiment of the invention including a conventional brake valve device in which the vent valve thereof is shown in section.

Referring now to FIG. 1, there is shown a conventional locomotive brake valve device 1 having a vent valve device 2 comprising a stepped differential piston member 3 and a spring-loaded valve element 4 carried by the piston member through a retaining ring 5. There are three chambers 7, 8, and 9 in which pneumatic pressure acts on different areas of the stepped differential piston member 3. A spring 10 in chamber 7 urges piston member 3 in a direction that brings valve element 4 into engagement with an annular valve seat 12, the inner periphery of which is vented to atmosphere via an exhaust passage 13. Valve element 4 and seat 12 thus constitute an exhaust valve of vent valve device 2. A source of compressed air that is normally maintained in a range of 110–130 psi is supplied from main reservoir pipe 14 to brake valve device 1 via branch pipe 15. A passageway 16 of brake valve device 1 conveys this compressed air to chamber 8 where it acts on a relatively small area of the right-hand side of stepped piston member 3. A safety control pipe 17 is charged with main reservoir pipe pressure via chamber 8, a choke 18 in piston member 3, chamber 7, and passageway 19.

Chamber 9, formed between the right-hand side of piston member 3 and the outer periphery of valve seat 12, is supplied with pneumatic pressure from brake pipe 23 via a branch pipe and passage 24. Operation of vent valve 2 can be accomplished either pneumatically, as will hereinafter be described in accordance with the present invention, or manually by operating a handle 25 of brake valve device 1 to emergency position. In accordance with this latter method of operation, a cam 26 is fixed on a cam shaft 27 for rotation with handle 25. Rotation of cam 26 actuates a push rod 28 to unseat valve element 4, when handle 25 is moved to an emergency position, as is well known.

A conventional, pneumatically piloted, spring-biased, two-position, there-way valve device 30 is represented by a graphic symbol in which the solid line between ports 31 and 32 represents the normal set position in which a volume reservoir 33 is connected to atmosphere and a dashed line between ports 32 and 34 represents the other position in which safety control line 17 is connected to volume reservoir 33.

A control port 35 of valve device 30 is connected by a line 36 to a control port 39 of a pneumatic valve device 40 that is identical to valve device 30. Valve device 40 is represented by a graphic symbol in which the solid line between ports 39 and 41 represents its set position and a dashed line between ports 39 and 42 represents the other valve position. Port 41 is connected by a pipe 43 to main reservoir branch pipe 15 and port 42 is vented. In this other position of valve device 40, control port 35 of valve device 30 is vented to atmosphere via ports 39 and 42, and in the set position of valve device 40, main reservoir pressure is connected via ports 41 and 39 to control port 35 of valve device 30. A control port 45 of valve device 40 is connected to brake pipe branch 24 via pipe 46.

A spring 47 of valve device 30 and a spring 48 of valve device 40 are effective to force the respective valve devices to their other position when the pilot pressure at control ports 35 and 45 drops below a predetermined value. In the embodiment of FIG. 1, for example, spring 47 is selected to operate valve device 30 to its other position when the pilot pressure at port 35 is less than 90 psi, and spring 48 is selected to operate valve device 40 to its other position when the pilot pressure at port 45 is less than 45 psi.

As long as the brake pipe pressure remains above the predetermined safe value at which spring 48 is selected to operate valve device 30, i.e., 45 psi, the pilot pressure connected to control port 45 via brake pipe branch 24 and pipe 46 overcomes the spring force to maintain valve device 40 in its set position, in which main reservoir pressure in a range between 110–130 psi is connected to the control port 35 of valve device 30 via pipe 43, ports 41,39 and pipe 36. This establishes pilot pressure at port 35 to maintain valve device 30 in its set position, against the force of spring 47, thereby venting volume reservoir 33 via ports 31,32 and interrupting communication between volume reservoir 33 and safety control pipe 17. It will be appreciated, of course, that in cutting off volume reservoir 33 from safety control pipe 17, pipe 17 is blanked and pressure is accordingly maintained in safety control pipe 17 and in chamber 7 of vent valve device 2 to maintain closure of the vent valve exhaust valve 4,12. In this manner, brake pipe pressure is effectively controlled by brake valve device 1 through manipulation of handle 25 in the usual, well-known manner, such handle manipulation typically effecting variation of brake pipe pressure through a range of values above 45 psi during service braking.

In the event the pressure carried in brake pipe 23 falls below this value of 45 psi, for any reason, the pressure in pipe 46 and effective at control port 45 of valve device 40 will drop below a value sufficient to overcome the force of spring 48, which will accordingly become effective to operate valve device 40 to its other position, in which ports 39,42 are connected. This, in turn, vents pilot pressure effective at control port 35 via pipe 36 and ports 39,42 of valve device 40, thereby allowing spring 47 to operate valve device 30 to its other position when the pilot pressure at control port 35 is reduced below approximately 90 psi corresponding to the value of spring 47.

In the other position of valve device 30, volume reservoir 33 is cut off from vent port 31 and is connected to safety control pipe 17 via ports 32,34. This, in effect, increases the volume of chamber 7 to which safety control pipe 17 is connected, and accordingly produces a relatively sudden drop in the pressure acting on the left-hand side of differential piston member 3 of vent valve device 2. Due to the restriction afforded by choke 18 preventing main reservoir pressure in chamber 7, where it acts on the right-hand side of piston member 3, from following the pressure drop effective in chamber 8, a force differential is created to actuate piston member 3 in a leftward direction. This results in valve element 4 being unseated to exhaust brake pipe pressure via branch pipe and passage 24, the unseated vent valve 4 and exhaust passage 13, thereby effecting a train brake application in the usual, well-known manner in response to the brake pipe pressure dropping below the preselected value of 45 psi.

Once the decreasing pressure in chamber 7 and safety control pipe 17 equalizes with the increasing pressure in volume reservoir 33, no further reduction of pressure in chamber 7 will occur; conversely, the pressure in chamber 7 will begin to increase by reason of the supply connection thereto via main reservoir branch pipe 15, passage 16, chamber 8, and choke 18. When the pressure in chamber 7 eventually builds up sufficiently to force differential piston 3 rightwardly, valve element 4 will be automatically reset to a seated position to effect closure of the vent valve exhaust valve and thereby terminate further venting of brake pipe pressure via vent valve exhaust passage 13. The time that vent valve element 4 is held open is sufficient to assure complete venting of brake pipe pressure, such time being a function of the size of choke 18 and the volume of reservoir 33.

Following closure of the vent valve exhaust valve, brake pipe pressure can be recharged to effect a release of the brake application imposed by the low brake pipe pressure.

As brake pipe pressure is recharged above 45 psi, the pilot pressure at control port 45 overcomes the opposing force of spring 48 to reset valve device 40 to its set position in which ports 39 and 41 are re-connected. This, in turn, supplies main reservoir pressure from branch pipes 15 and 43 of main reservoir pipe 14 to pipe 36 leading to control port 35 of valve device 30. When this pilot pressure at control port 35 builds up to 90 psi, the force of spring 47 is overcome and valve device 30 is reset to its one position in which safety control pipe 17 is blanked and volume reservoir 33 is connected to atmosphere via vent port 31. Volume reservoir 33 is thus depleted of pressure and the circuit is conditioned for a subsequent cycle of operation any time brake pipe pressure falls below the predetermined safe value of 45 psi.

It is noteworthy to mention at this time that the purpose of employing valve device 40 in the system, as an interlock, instead of controlling valve device 30 directly from brake pipe pressure, is to avoid a possible failure to detect a relatively slow drop in brake pipe pressure below 45 psi. It will be appreciated that, depending upon the design of the particular type of valve device 30 employed, transition between its respective positions can result in a restricted flow path between ports 32 and 34 until the transition is complete. In such case, the flow of pressure from safety control pipe 17 to volume reservoir 33 could be too slow to drop the pressure in vent valve chamber 7, due to the fact that pressure is being constantly supplied to chamber 7 from main reservoir pipe 15, passage 16 and choke 18. The inability to develop a pressure drop in chamber 7 would, of course, preclude the desired actuation of the vent valve device and the low brake pipe pressure would fail to initiate the intended brake application.

The advantage of the interlock feature provided by valve device 40 is to isolate brake pipe pressure from valve device 30, which valve device performs the actual triggering function necessary to actuate the vent valve device. Consequently, a relatively short length of pipe 36 can be employed to supply pilot pressure to valve device 30, as compared to the considerably greater length of brake pipe 23. This results in a relatively small volume of pilot pressure effective at valve device 30, thereby encouraging a relatively rapid pressure change at control port 35, even in the event a slow transition of valve device 40 occurs. Consequently, valve device 30 is assured of transitioning rapidly, thereby guaranteeing a drop of pressure in safety control pipe 17 and volume 7 to accordingly effect actuation of vent valve device 2, even when the low brake pipe pressure reaches its predetermined value of 45 psi so slowly that it would otherwise fail to trigger the vent valve device 2.

Figure 2:
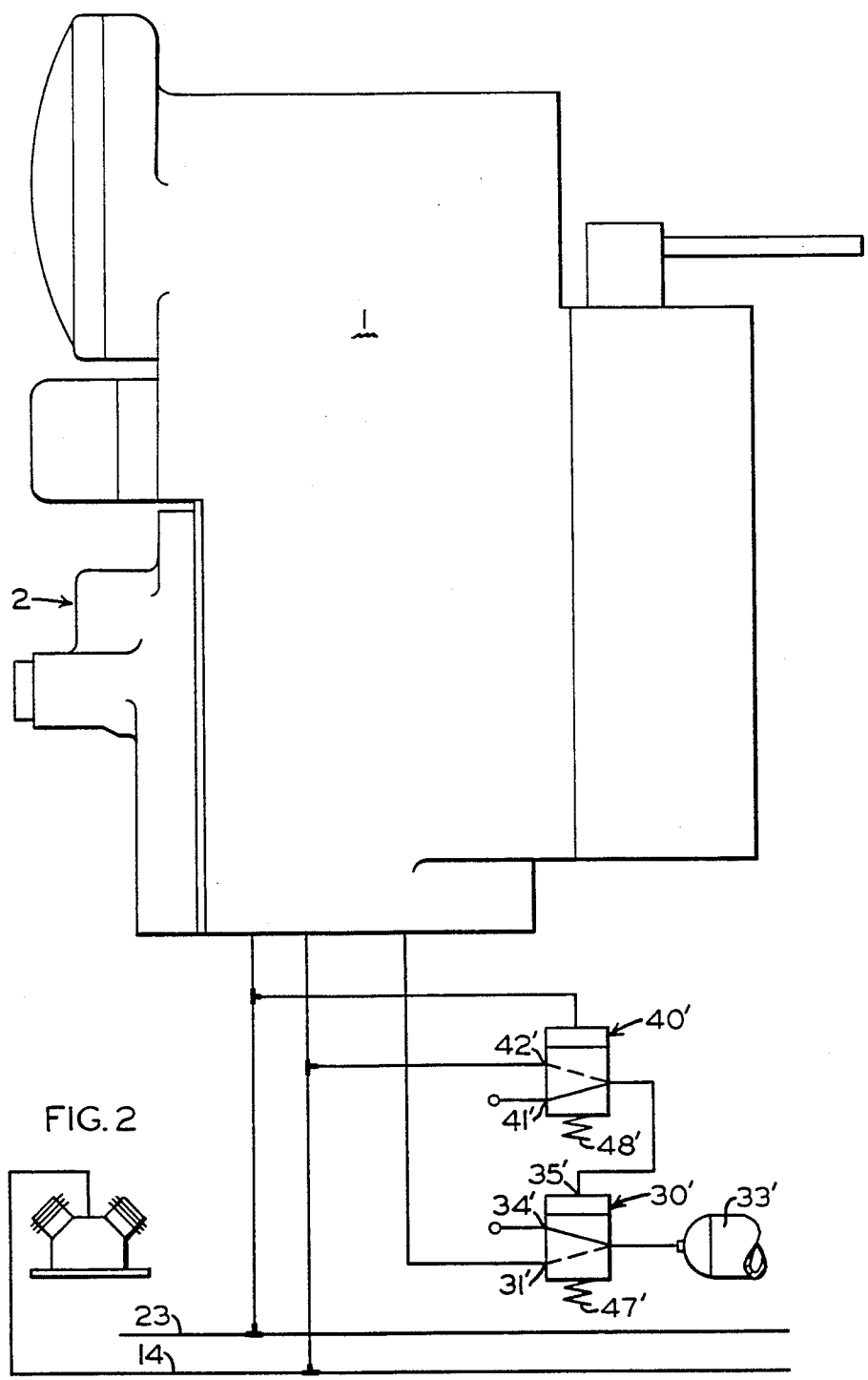
FIG. 2 is a diagrammatic arrangement of an alternate embodiment of the invention arranged for operation with the brake valve device of FIG. 1.

In the alternate arrangement of FIG. 2, valve devices 30' and 40' are identical to the corresponding valve devices 30 and 40 in the arrangement of FIG. 1, differing only in that the pipe connections to ports 31' and 34' of valve device 30' and to ports 41' and 42' of valve device 40' are reversed from the corresponding pipe connections to valve devices 30 and 40, and that spring 47' of valve device 30' is selected such that valve device 30' is forced to its normal set position when the pilot pressure at port 35' is below approximately 10 psi.

Except for the fact that valve device 30' is actuated on the basis of a pressure reduction, as opposed to valve device 30 being actuated on an increasing pressure, the operation of arrangement of FIG. 2 is the same as that of FIG. 1 and thus should not require any further explanation.

I claim:

1. A brake assuring circuit for automatically initiating a brake application on a railway train when the fluid pressure carried in the train brake pipe is below a predetermined safe operating value comprising:
   (a) a source of fluid having at least a certain chosen pressure;
   (b) a safety control pipe normally charged with fluid under pressure from said source;
   (c) vent valve means for interrupting the exhaust of fluid under pressure from said brake pipe only in the absence of a reduction of fluid pressure in said safety control pipe;
   (d) a volume reservoir; and
   (e) valve means for connecting said safety control pipe to said volume reservoir to effect a reduction of fluid pressure in said safety control pipe when said brake pipe fluid pressure drops below a value corresponding to said predetermined safe operating value.

2. A brake assuring circuit as recited in claim 1, wherein said valve means comprises a first pneumatically piloted, two-position, valve device having a first port to which said volume reservoir is connected, a second port to which said safety control pipe is connected, and a third port connected to atmosphere.

3. A brake assuring circuit as recited in claim 2, wherein said first and third ports are interconnected in a set position and said first and second ports are interconnected in the other position of said valve device.

4. A brake assuring circuit as recited in claim 3, wherein said valve device is in said set position when said brake pipe pressure exceeds said predetermined safe value and is in said other position when said brake pipe pressure is less than said predetermined safe value.

5. A brake assuring circuit as recited in claim 4, wherein said first valve device is further provided with a control port and said valve means further comprises a second pneumatically piloted, two-position valve device having a first port connected to said control port of said first valve device,, a second port connected to atmosphere and a third port connected to said source of fluid under pressure.

6. A brake assuring circuit as recited in claim 5, wherein said first and third ports of said second valve device are interconnected in a set position thereof and said first and second ports are interconnected in the other position thereof.

7. A brake assuring circuit as recited in claim 6, wherein said second valve device is further provided with a control port to which said brake pipe fluid under pressure is connected, said second valve device being in said set position thereof only so long as said brake pipe fluid pressure exceeds said predetermined safe value.

8. A brake assuring circuit as recited in claim 7, wherein said second valve device further comprises a bias spring, the force of which is such as to actuate said second valve means to said other position when said brake pipe pressure at said control port thereof is less than said predetermined value.

9. A brake assurance circuit as recited in claim 8, wherein said first valve device further comprises a bias spring the force of which is such as to actuate said first valve device to said other position when the pressure at said control port thereof is less than said certain chosen value.

10. A brake assurance circuit as recited in claim 4, wherein said first valve device is further provided with a control port and said valve means further comprises a second pneumatically-piloted, two-position valve device having a first port connected to said control port of said first valve device, a second port connected to said source of fluid and a third port connected to atmosphere.

11. A brake assurance circuit as recited in claim 10, wherein said first and third ports of said second valve device are inter-connected in a set position thereof and said first and second ports are inter-connected in the other position thereof.

12. A brake assurance circuit as recited in claim 11, wherein said second valve device is further provided with a control port to which said brake pipe fluid under pressure is connected, said second valve device being in said set position thereof only so long as said brake pipe fluid pressure exceeds said predetermined safe value.

13. A brake assurance circuit as recited in claim 12, wherein said second valve device further comprises a bias spring the force of which is such as to actuate said second valve device to said other position when said brake pipe pressure at said control port thereof is less than said predetermined value.

14. A brake assurance circuit as recited in claim 13, wherein said first valve device further comprises a bias spring the force of which is such as to maintain said first valve device in said set position only until such time as pressure is developed at said control port of said first valve device in response to said second valve device being shifted from said set position to said other position thereof.

* * * * *